Patented Aug. 22, 1933

1,923,803

UNITED STATES PATENT OFFICE 1,923,803

BRIQUETTE AND METHOD OF PRODUCING SAME

Walter E. Trent, New York, N. Y., assignor to Trent Process Corporation, New York, N. Y., a Corporation of Delaware No Drawing. Application October 16, 1930
Serial No. 489,223

7 Claims. (Cl. 75—73)

My invention relates to the production of briquettes and like consolidated fuel masses and more particularly has reference to briquettes containing carbon and metal in a state which requires or is to be given heat treatment in the presence of carbon.

It is an object of my invention to provide briquettes which may be employed as a self-contained charge for blast furnace and other metal treating operations wherein an ore or metal is to be heated in the presence of or in close association with carbon or solid carbonaceous material.

A further object of my invention resides in the provision of briquettes of the character referred to which also contain a desulfurizing agent for the ore to be heat treated, such agent additionally serving to flux the ash of the carbonaceous material and the gangue of the ore.

It is a further object of my invention to produce briquettes of the character stated wherein the binder for the briquettes supplies additional carbon in the presence of which a metal or ore is to be heat treated.

Other objects and advantages of my invention will appear from the more detailed description thereof.

In its broadest aspects my invention is directed to a briquette, as well as to its method of production, containing carbon or solid carbonaceous material and metal in a state which requires heating in the presence of carbon. The invention is of particular utility when the briquette is made to contain iron ore which is to be supplied to a blast furnace for reduction to metallic iron but it will be understood that other metallic ores to be reduced may be similarly briquetted with carbonaceous material constituting the reducing agent. The invention may also be applied to an ore which has already been partially reduced and which is to undergo further or complete reduction.

The invention may further be applied to and my briquette made to contain, in lieu of the ore, the metallic or sponge iron resulting from the direct process for reducing iron ores to the metallic state. In the direct process the ore is reduced to metal without melting and in such operation the metal does not absorb carbon. Accordingly the metallic product of the direct process is very high in melting point and it can be placed in the form of pig iron only by heating in the presence of carbon so that the metal will absorb about 2% carbon. Where it is desired to convert such metallic or sponge iron into pig iron, the same may be briquetted with carbonaceous material to form a self-contained charge for the heat treatment in the presence of carbon.

In order to afford a better understanding of my invention, I will hereinafter describe a specific embodiment thereof with respect to the production of a briquette containing iron ore which is to be supplied to a blast furnace for reduction to the metallic state in the presence of carbon. However, the invention is not to be construed as limited to this modification since other metallic substances to be heat treated in the presence of carbon may be incorporated into the briquette in lieu of iron ore, as above indicated. Also the invention is not to be understood as limited to the details of operation and to the nature and percentages of materials hereinafter set forth as these are given for illustrative purposes only and may be varied considerably without departing from the spirit and scope of the invention.

The iron ore to be incorporated into briquettes is preferably first magnetically or otherwise concentrated and then washed with water in any known and suitable manner in order to remove flocculent and finely divided material which was not removed by the first treatment. This fine material is objectionable as gangue, and is also objectionable on account of its fine state of division which "powders" the ore thus making the bonding of the briquette more difficult and requiring additional binder and flux. The iron oxide concentrates are now ready for admixture with the solid carbonaceous material and a suitable binder, and molding into compact masses.

The solid carbonaceous material may comprise anthracite coal, coke, or the like, and there may be used as the binder material any substance capable of holding the admixed particles together. However, according to the preferred embodiment of my invention, I mix with the iron oxide concentrates a coal-oil amalgam made in accordance with the teachings of my prior Patent No. 1,420,164. In the process of this patent finely divided coal is agitated with a hydrocarbon oil treating agent in a body of water with the result that the non-carbonaceous or ash forming constituents of the coal are separated from the carbon particles, the latter agglomerating with the oil to form the coal-oil amalgam referred to. In this way the coal or other carbonaceous material is purified and the carbon content thereof intimately associated with a hydrocarbon oil which may be such as to serve as the binder material for the briquette. For the present purposes, the hydrocarbon oil employed as the agglomerating agent may be a crude oil or a fuel oil and is preferably an oil having an asphalt base such as Venezuela crude oil. The resulting amalgam will be found to consist substantially of 75% purified coal, 15% asphaltite base oil, and about 10% water.

The amalgam thus formed is mixed with the iron oxide concentrates in an amount sufficient to supply enough carbon for the reduction process to be applied to the oxide and to supply sufficient fuel to meet all the heat requirements of the smelting and I prefer to mix the concentrates and the amalgam in approximately equal proportions. The resultant mixture is now distilled to vaporize the water and the light fractions of the amalgamating oil leaving an oil residue in the mixture. If crude oil, such as Venezuela crude, has been employed as the agglomerating agent, the distillation may be such as to remove about 50% of the oil, the distillation being preferably carried out in a closed retort so that the volatilized hydrocarbons may be recovered by condensation and collection.

This distillation step not only removes the water of the amalgam but also the moisture and chemically combined water of the ore before making the briquette which is important to make the best grade of briquette.

The distilled mixture comprising purified and washed iron ore concentrates, purified coal, and oil residues, preferably while still hot, is now briquetted or otherwise molded into desired shapes in any known manner, the oil residue functioning as the binder for the solid particles. The resultant briquettes or compressed masses are now baked or carbonized in any known manner, preferably at a red heat, whereby sufficient strength is imparted to the briquettes to make them suitable as a self-contained blast furnace charge, the iron oxide being intimately associated with the carbonaceous fuel supplying and reducing agent. During the carbonization the oil residue is converted to petroleum coke which adds to the amount of fuel and reducing agent in the briquettes.

As previously indicated, the briquette may be made to contain a desulphurizing and fluxing agent in addition to the metallic and carbonaceous materials. As such an agent I may employ limestone in amount sufficient to convert the iron sulphide and organic sulphur compounds in the ore into calcium sulphide and to also flux the ash of the coal and the gangue of the ore. It will, of course, be understood that when the carbonaceous material has been purified by the amalgamating process above referred to, smaller amounts of the fluxing agent will be necessary than when the coal has not been thus purified. When constructing the briquettes of highly concentrated iron ore and a coal which has been previously amalgamated as above described, I find that the incorporation of about 7 or 8% limestone in the briquettes is sufficient to convert the sulphur and to slag the impurities such as silica and the like which make up the gangue of the ore and the ash of the coal. If it is desired to incorporate limestone or other desulphurizing and fluxing agent into the briquette, this is preferably accomplished by adding such material in pulverized form to the amalgamating oil before the latter is mixed with the carbonaceous material in a body of water. The green or uncarbonized briquettes will thus contain the concentrated and washed iron ore, carbonaceous material, oil, water, and dispersed pulverized limestone or like desulphurizing and fluxing agent. The conversion of the sulphur compounds in the ore is partially effected during the carbonization of the briquettes and is completed during the descent of the briquettes through the blast furnace. The carbonized briquettes prior to introduction to the blast furnace therefore comprise the iron ore concentrates, anthracite coal or coke, petroleum coke as a binder, calcium oxide, and calcium sulphide. As stated, the conversion of the sulphur into calcium sulphide is completed in the blast furnace and at the tuyère zone in the blast furnace the calcium sulphide becomes part of the slag and the sulphur thus kept out of the metal. The desulphurizing and fluxing action of the limestone is completed as the charge descends through a zone of the blast furnace maintained at between 2000 and 3000 degrees F.

Briquettes produced as above described constitute a self-contained blast furnace charge of considerable strength and containing all the fuel necessary for smelting, the iron oxide being intimately associated with the reducing and desulphurizing and fluxing agents and there being no necessity for supplying additional materials to the furnace. However, in some cases where the iron ore is not of sufficient purity, the briquette may contain more carbon than is necessary and in such event additional lump ore may be added at the blast furnace. Also, in the use of such impure ores, if it is impossible to incorporate sufficient limestone into the briquette, then an additional amount may be supplied as a flux to the blast furnace.

I have above described my invention with particular reference to the use of petroleum oil in making the briquettes but I have found the use of low temperature tar oils distilled from bituminous coal to be especially desirable inasmuch as it results in a very strong and rugged product. I will therefore now describe an embodiment of the invention employing such an oil.

Into 100 parts by weight of low temperature tar oil distilled from bituminous coal there is first incorporated, by mixing, 50 parts by weight of powdered limestone. The resultant mixture is then amalgamated in water with powdered anthracite coal, as above described, in such proportions that the resultant amalgam will consist of from 15 to 30% oil, about 10% water, and the remainder purified anthracite coal. For each part of amalgam by weight there is added about 2 parts of iron ore concentrates, preferably water washed for reasons already described. The mixture is then distilled at about 600 degrees F. to remove about 50% of the tar oil and to leave an oil residue in the mixture which is now briquetted, preferably while still hot, and the briquettes carbonized at a red heat.

In addition to yielding a strong and rugged briquette, the tar oil employed as described has the further advantage of being practically free of sulphur. Nearly all petroleum products are quite high in sulphur content, crude oils and fuel oils generally containing from 2 to 4%. Such percentages of sulphur are undesirable in metallurgical operations despite the fact that the sulphur content of the oil, which does not distill off, is converted into calcium sulphide by reaction with the limestone.

I have thus far described my invention with reference to the use of anthracite coal and coke as the solid carbonaceous material inasmuch as I have found the use of these materials to be preferable to the use of raw bituminous coal. Coals of the latter type tend to melt and fuse during the baking or carbonizing operation and thus have a tendency to deleteriously affect the briquettes. However, my invention contemplates the employment of bituminous coals and in order to overcome the difficulty referred to, I first preliminarily distill the raw bituminous coal, preferably at from 1100 degrees F. to 1200 degrees F., thereby obtaining tar oils and low temperature coke which are well suited for the production of the briquettes. The coke, after pulverization, and tar oil thus obtained are then mixed with the iron ore concentrates and, if desired, limestone in the proportions already given and the mixture processed as described above to produce the finished briquettes. It will be seen that the preliminary distillation of the raw bituminous coal furnishes both the coke and the tar oil for the briquette production.

The modifications of the invention above described are the preferred modes of operation for the production of my blast furnace briquettes which are preferably made to contain coal or coke and lime. However, the presence of these two ingredients is not essential and I contemplate the manufacture of briquettes from only the ore concentrates and tar oil or petroleum oil, the oil supplying both the fuel base and the binder and being in sufficient amount for these two purposes. In such a modification of the invention, the iron ore and the oil are preferably mixed in about equal proportions, the mixture distilled to remove about 50% of the oil as lighter fractions and leave an asphaltic or pitchy residue, the mixture briquetted, and the briquettes baked or carbonized at a red heat, all as already fully described. The oil in such a case may be a tar oil obtained by the distillation of bituminous coal or an asphaltic base petroleum oil such as Venezuela crude and the finished briquette will contain about one part carbon by weight to about 2 to 2½ parts iron ore concentrates. Such a briquette may of course be made to contain limestone as above described.

I have herein described my invention with considerable particularity and disclosed several modifications thereof for purposes of illustration, but such disclosures and descriptions are not to be construed as limiting upon the invention as defined in the appended claims.

Having thus described my invention, what I claim is:

1. A process which comprises purifying coal by amalgamating the same with hydrocarbon oil in the presence of water and separating the resultant amalgam, mixing with the amalgam a metallic substance to be heat treated in the presence of carbon, distilling the mixture to remove water and light fractions of the oil and briquetting the same, and carbonizing the briquettes.

2. A process which comprises mixing iron oxide concentrates with coal and hydrocarbon oil, distilling the mixture to remove light fractions of the oil and leave an oil residue in the mixture, briquetting the mixture, and carbonizing the resultant briquettes.

3. A process which comprises agitating finely divided coal with an asphalt base hydrocarbon oil in the presence of water and separating the resultant coal-oil amalgam, mixing iron oxide concentrates with said amalgam, distilling the mixture to remove light fractions of the oil and to leave an oil residue in the mixture, briquetting the mixture, and carbonizing the briquettes.

4. A process for producing a self-contained charge for blast furnaces which comprises agitating finely divided coal with pulverized limestone and hydrocarbon oil in the presence of water and separating the resultant amalgam, mixing iron ore concentrates with the amalgam and distilling the mixture to leave an oil residue therein, briquetting the mixture, and baking the briquettes.

5. A process for producing a self-contained charge for blast furnaces which comprises mixing iron ore concentrates with a substantial amount of hydrocarbon oil, distilling the resultant mixture to remove lighter fractions of the oil and to deposit an oil residue in the concentrates, and briquetting the distilled mixture.

6. A process which comprises amalgamating coal and hydrocarbon oil in a body of water and separating the resultant amalgam from the body of water, mixing iron ore with the amalgam, distilling the mixture to vaporize a portion of the oil and to dehydrate the ore, briquetting the distilled mixture, and baking the briquettes.

7. As an article of manufacture, a briquetted and carbonized mixture of a metallic substance to be heat treated in the presence of carbon and a coal-oil amalgam substantially free of ash-forming constituents.

WALTER E. TRENT.